Patented Mar. 24, 1931

1,797,804

UNITED STATES PATENT OFFICE

FRITZ STOEWENER, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

MANUFACTURE OF ACTIVE MASSES

No Drawing. Application filed July 16, 1926, Serial No. 123,028, and in Germany July 27, 1925.

Catalysts precipitated on a colloidal support have hitherto been prepared by treating the dry porous support for example active silica gel with the catalytic substances or the materials forming such cataylsts, for example metal salts, whereby the catalytic materials were deposited within the pores of the colloidal support, or by simultaneously precipitating both the catalytic substance and the support in the colloidal state. For example by adding a sodium silicate solution to a solution of copper sulfate, preferably acidulated, a mixed precipitate of copper hydroxid and silica is produced. In the first process referred to above the pores of the colloidal support are easily choked or destroyed by the treatment, while the second process involves a great drawback in that the precipitation takes place in distinct relationship of the components.

I have now found that very active colloidal supports with catalysts thereon can be readily obtained by preparing the support in a colloidal condition—whether dissolved, or coagulated—, mixing the wet colloid before drying it by heat intimately with the catalytic substance or the materials forming such catalytic substance and drying the mixture so obtained; the mass can be purified by washing before or after drying it completely or partially. As suitable catalytic substances metals in the form of acetates, carbonates, nitrates, ammonium salts and other metal compounds having a component volatilizable at elevated temperatures are best suitable. However, any other compounds may also be employed. The said substances are used in the form of solutions or in a finely divided solid state, in the latter case preferably in a colloidal state. The process according to my invention can be applied to all "irreversible colloids of the second kind that is to say irreversible colloids which when dried may however again be brought into solution with the aid of peptizing agents, provided they have not been too far dehydrated (see Zsigmondy, Kolloidchemie (1920), page 30) for example silica, alumina, iron oxid and the like. For the mixing operation the colloidal support is preferably employed in the form of a sol in order to obtain a very uniform product, but it may also be employed as a jelly, as will be described hereinafter.

When employing the support in the form of a sol the catalytic addition or several additions each alone or mixed with each other are added thereto in the liquid or in a finely divided solid, preferably colloidal state advantageously without first subjecting the sol to a tedious purification. Part of the additions may also be added to the components used for the formation of the sol, in which case the remainder of the additions is added after the sol has been produced. By suitably controlling the quantities of the additions it is possible to cause the sol to set to a homogeneous jelly directly after the addition has been made or after standing for some length of time and on heating, if required.

When the colloidal support is employed in the form of a jelly, the support preferably after being purified with or without the employment of pressure before or during the purification, is suspended in a small quantity of water or of a suitable solution, whereupon the catalytic substance or substances are added one after the other or in mixture with each other. Or one or more components of the catalyst are added during the preparation of the sol or jelly, while the rest is admixed after making the jelly.

The process according to my invention has the advantage that any desired quantity of the catalyst can be incorporated with the support without difficulty and nevertheless hard, porous masses are obtained which possess a high adsorbing power for gases and vapors and can also be employed for refining liquids. In some cases it is advantageous to press the jelly whether free from or containing the additions before drying it, whereupon it may be subjected, preferably in the moist state, to mechanical treatment, for example in a ball mill, when one or more additions may be admixed simultaneously. Such mechanical treatment may also take place without the jelly being subjected to pressure. The adsorbing power of the products can often be increased by removing the included additions or their decomposition products such as metal oxids, from the dry or partially dried masses, partially or completely preferably after saturating them with water vapor, for example by treatment with liquid or gaseous acids for instance nitrogen oxids and water vapor or by other dissolving means. On the the other hand, further additions may be incorporated with the masses obtained according to my invention in the manner hitherto usual. In case the masses contain metal oxids, they may be reduced to metals or lower oxids by treatment with suitable reducing agents.

The following examples will further illustrate how my invention may be carried out in practice, but the invention is not limited to these examples.

*Example 1*

100 litres of sodium silicate solution of 1.164 specific gravity are caused to run into 23.5 litres of sulfuric acid of 31 per cent strength while stirring well. A clear silica sol is formed to which at once a copper sulfate solution of 13 per cent strength is added while stirring or the sol is added to the copper sulfate solution, whereby the sol is preserved without the formation of a precipitate, which sol coagulates to a homogeneous, clear jelly only after standing for some time or on heating. The jelly is washed partially, dried at about 100° C., saturated with water vapor and washing completed, whereupon the mass is dried at between 150° and 300° C. By treatment with acids which is preferably carried out after saturation with water vapor which is favorable for the size of the grains, the copper oxid can be partially or completely removed from the support.

*Example 2*

By mixing equal volumes of commercial sodium silicate solution of 1.083 specific gravity and double normal acetic acid a sol is obtained which after some time sets to a transparent jelly. The jelly is thoroughly washed with distilled water and slightly pressed until the pure jelly contains 94.5 per cent of water. 3 kilograms of the pressed mass are suspended in water by stirring. A solution of 31 grams of uranyl nitrate or 132 grams of mercurous nitrate or 42 grams of ammonium vanadate is introduced into this suspension while stirring, the quantity of water employed for suspending the jelly and dissolving the salts amounting to between 2 and 3 litres. The mixture is stirred for some time and allowed to settle, whereupon the liquid is decanted. The jelly is filtered off by suction, once superficially washed and dried while raising the temperature slowly from 50° to 220° C. On heating to still higher temperatures, nitrogen oxids or ammonia respectively are evolved and masses containing uranium oxid or mercuric oxid or vanadium oxid respectively precipitated on colloidal silica are obtained. The mercuric oxid mass evolves oxygen at more elevated temperatures so that a mass consisting of mercury on colloidal silica is obtained.

Now what I claim is:

1. The process of producing active masses which comprises preparing an irreversible colloid of the second kind, mixing it before drying with a catalytic substance and drying the mixture.

2. The process of producing active masses which comprises preparing an irreversible colloid of the second kind, mixing it before drying with a catalytic substance and purifying and drying the mixture.

3. The process of producing active masses which comprises preparing an irreversible colloid of the second kind, mixing it before drying with a catalytic substance, drying the mixture and removing catalytic substance from the product.

4. The process of producing active masses which comprises preparing an irreversible colloid of the second kind, mixing it before drying with a catalytic substance, drying the mixture and removing substantially all of the catalytic substance from the product.

5. The process of producing active masses which comprises preparing an irreversible colloid of the second kind, mixing it before drying with a catalytic substance, drying the mixture, saturating it with water vapor and removing catalytic substance from the product.

6. The process of producing active masses which comprises preparing an irreversible colloid of the second kind, in the form of a sol mixing it before drying with a catalytic substance and coagulating and drying the mixture.

7. The process of producing active masses which comprises preparing silica sol, mixing it before drying with a compound of a metal oxid with a component volatilizable at elevated temperatures, and drying the mixture.

In testimony whereof I have hereunto set my hand.

FRITZ STOEWENER.